United States Patent
Line

(10) Patent No.: US 11,985,255 B2
(45) Date of Patent: *May 14, 2024

(54) DATA INTEGRITY VALIDATION VIA DEGENERATE KEYS

(71) Applicant: TEXAS INSTRUMENTS INCORPORATED, Dallas, TX (US)

(72) Inventor: Michael John Line, University Park, MD (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,327

(22) Filed: May 25, 2022

(65) Prior Publication Data
US 2022/0286298 A1 Sep. 8, 2022

Related U.S. Application Data

(63) Continuation of application No. 16/693,795, filed on Nov. 25, 2019, now Pat. No. 11,374,770.

(51) Int. Cl.
*H04L 9/32* (2006.01)
*H04L 9/06* (2006.01)
*H04L 9/08* (2006.01)

(52) U.S. Cl.
CPC .......... *H04L 9/3249* (2013.01); *H04L 9/0643* (2013.01); *H04L 9/0825* (2013.01); *H04L 9/3263* (2013.01)

(58) Field of Classification Search
CPC ... H04L 9/3249; H04L 9/0643; H04L 9/0825; H04L 9/3263
See application file for complete search history.

(56) References Cited

U.S. PATENT DOCUMENTS 8,023,647 B2 * 9/2011 Shaik .................... H04L 9/0844
380/30
2009/0259850 A1 10/2009 Ishibashi
(Continued)

OTHER PUBLICATIONS

Notification of Transmittal of the International Search Report and the Written Opinion of the International Searching Authority, or the Declaration; PCT/US 2020/059628; dated Feb. 18, 2021, 7 pages.
(Continued)

*Primary Examiner* — Mohammed Waliullah
(74) *Attorney, Agent, or Firm* — Brian D. Graham; Frank D. Cimino

(57) ABSTRACT

Systems and methods for developing a novel public/private key pair having unique properties are disclosed, whereby standard data security operations in existing data security infrastructures return a data integrity validation result—but do not provide the intended data security of such infrastructures. These novel keys are referred to as degenerate keys and may be used to replace the public and private keys in existing public/private key cryptosystems. Because degenerate key data integrity validation may leverage existing data security infrastructures that are already widely-implemented, such examples may be applied immediately and configured to seamlessly transition from integrity only modes back to secure modes. In some instances, the degenerate key examples described herein may be employed during a software testing and/or factory validation stage of product development to allow for data integrity validation before burning in a developer's active (i.e., non-degenerate) key to the product, thereby pairing the software to the hardware.

21 Claims, 1 Drawing Sheet

(56) References Cited

U.S. PATENT DOCUMENTS

2011/0016317 A1   1/2011   Abe
2013/0322619 A1   12/2013  Yoshimi et al.

OTHER PUBLICATIONS

"Akira Takahashi, Degenerate Fault Attacks on Elliptic Curve Parameters in OpenSSL, Aug. 22, 2019, 2019 IEEE European Symposium on Security and Privacy (EuroS&P), p. 371-386" (Year: 2019).

"Seth D. Bergmann, Degenerate Keys for RSA Encryption, inroads—SIGCSE Bulletin, Jun. 2009, vol. 41, No. 2" (Year: 2009).

* cited by examiner

DATA INTEGRITY VALIDATION VIA DEGENERATE KEYS

CROSS-REFERENCE TO RELATED APPLICATIONS

This application is a continuation application of U.S. patent application Ser. No. 16/693,795, filed on Nov. 25, 2019, which application is hereby incorporated by reference in its entirety.

BACKGROUND

Data security, e.g., as implemented via the usage of various encryption methodologies, including public-key cryptography or asymmetric cryptography, is a useful tool in modern computer systems, applications, devices, and protocols. For example, by encrypting a message using an authorized recipient's public key, the message may only be decrypted (thereby unlocking the actual content of the message) using the recipient's complimentary private key, which private key must be kept secure by the recipient. Many forms of encryption rely on complex mathematical operations that make it practically impossible, at least on feasible time scales, for an unauthorized third party to break the encryption.

In addition to data security, data integrity validation is also important in many modern computer systems, applications, devices, and protocols. Data integrity validation refers to the process of validating the accuracy of the underlying data, e.g., confirming that there have been no unintended changes to the data over a given period of time—regardless of who has authority to access/decrypt the true underlying value of the data or who the data was sent from. Thus, while data security attempts to control who can gain access to data, data integrity validation refers to the process of ensuring the data that is accessed has the value that it is supposed to have.

In a typical secure data transmission scenario, input data, e.g., a document or other electronic data image, may be digitally signed by the owner of such input data (e.g., in addition to optionally encrypting the contents of such input data itself) and then sent to a recipient. Digital signatures may be used to provide additional verification as to the origin, identity, and/or status of the input data and can serve as a trusted indication of informed consent by the signer. To create a digital signature, a sending entity may use software to create a one-way hash of the input data that is to be signed. The sender's private key may then be used to encrypt the hash. The encrypted hash of the input data, along with other optional information, such as the hashing algorithm used, may collectively be referred to herein as the digital signature.

A digital signature verification process may then be used by the recipient to ensure that the document has not been tampered with or modified in any way by a third-party during transit. For example, if a third party had changed even a single bit of data in the input data, it would then hash, with almost 100% certainty, to a different value, allowing the recipient to determine that data integrity had not been maintained or that the digital signature was created with a private key that doesn't correspond to the public key presented by the signer. If, instead, the decrypted hash does match a hash of the same data computed by the recipient, it would prove that the data hadn't changed since it was originally signed by the sender, i.e., that data integrity had been maintained.

In some instances, being able to perform a data integrity check on a first piece of input data may be more important than performing a full digital signature verification process on the input data (i.e., which also includes verifying the sender's identity). In other instances, performing a full digital signature verification may not be necessary at all. Thus, it may be desirable to have a system for performing a data integrity validation check that does not have to perform a full digital signature verification process, but which still leverages existing data security infrastructures to perform the data integrity validation check.

SUMMARY

Examples disclosed herein provide systems and methods for developing a novel public/private key pair having a unique property, whereby standard data security operations in existing data security infrastructures return a data integrity validation result—but do not provide the intended data security of such infrastructures. Keys having this unique property are referred to herein as degenerate keys and may be used to replace the public and private keys in existing public/private key cryptosystems. Degenerate keys may be configured to work with a number of current public/private key authentication implementations, e.g., including the Rivest-Shamir-Adleman (RSA) cryptosystem for secure data transmission. Because the degenerate key data integrity validation examples disclosed herein may leverage existing data security infrastructures that are already widely-implemented, such examples may be applied immediately and may be configured to seamlessly transition from integrity only modes (i.e., modes that perform data integrity validation but do not provide data security) back to secure modes (i.e., modes that would perform both data integrity validation as well as providing data security), when desired.

In some instances, the degenerate key examples described herein may be employed during a software testing and/or factory validation stage of product development. That is, software building and testing may be done by developers using degenerate keys (i.e., providing only data integrity checking) and then, e.g., when the software and/or device has passed validation, firmware may be used to burn in one or more programmable fields with values that may only be set once for a board or other electronic device (e.g., using e-fuses or other similar technologies) with the developer's active key (i.e., a cryptographic key that is not specifically modified to be a degenerate key, as defined herein). After that process, the board or other device will reject any future data and/or programs that are not signed with a key that matches the one that had been burned into it, thereby effectively pairing the software to the hardware. Another advantage of the examples described herein is that they allow existing factory programming and verification workflows to remain unchanged—other than the particular digital signing algorithm used to generate the degenerate keys employed during the testing and/or validation stages of the product development.

It may be understood that, while techniques herein are discussed largely in the context of degenerate RSA keys, nothing in this disclosure is meant to limit these techniques to RSA-based public-key cryptosystems. Rather, the techniques discussed herein may be readily applicable across a broad range of cryptosystems and encryption methodologies, including, the Digital Signature Standard (DSS), ElGamal, and others. The techniques discussed here are also further applicable to performing data integrity validation checks on various types of data certificates, as well as on secure, securable, non-secure, and/or general purpose devices.

BRIEF DESCRIPTION OF THE DRAWINGS

For a detailed description of various examples, reference will now be made to the accompanying drawings in which.

DETAILED DESCRIPTION

Figure 1:
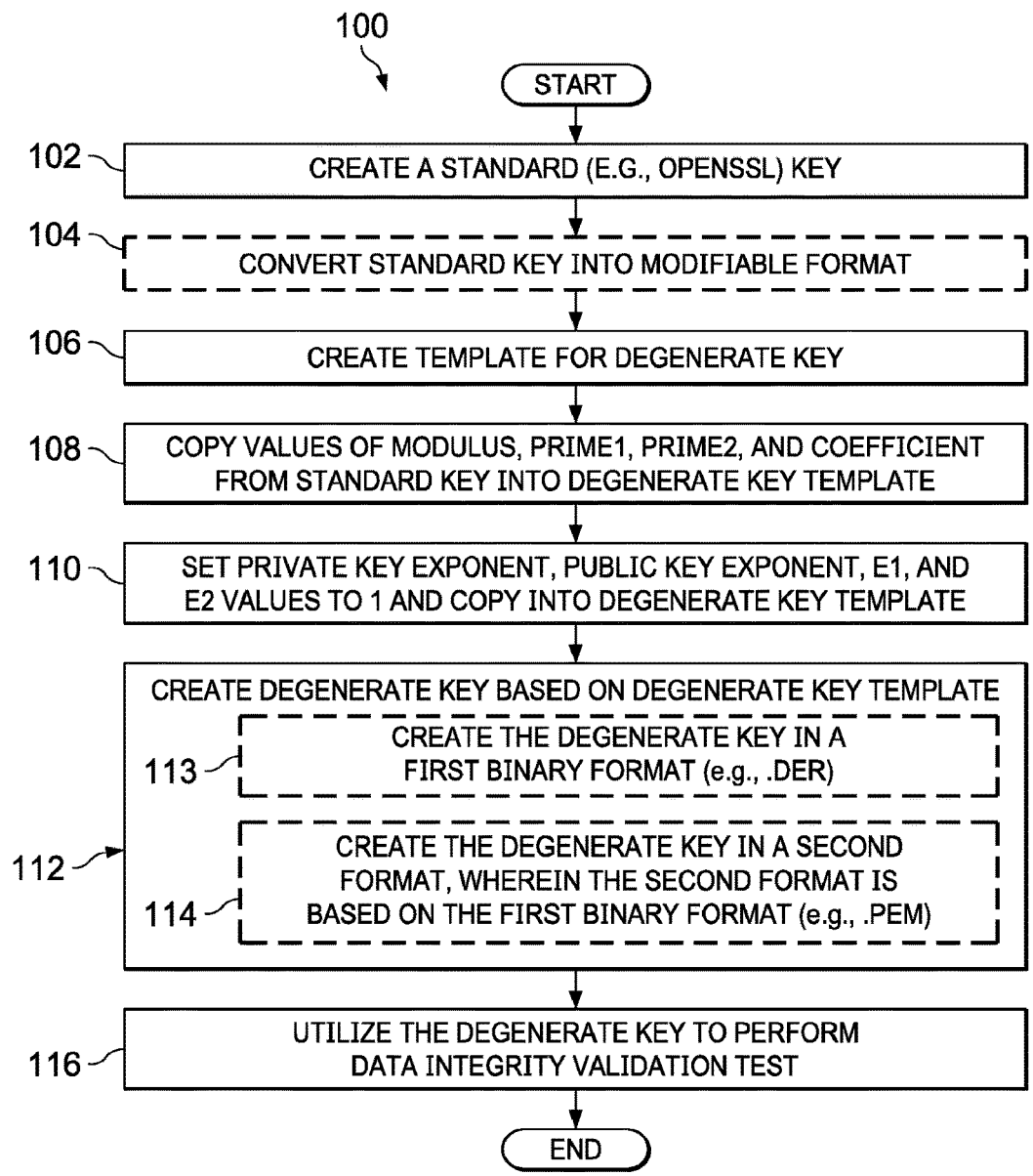
FIG. 1 is a flow chart illustrating a technique for performing data integrity validation via the utilization of degenerate keys, in accordance with aspects of the present disclosure.

As described above, in some instances, it may be desirable to perform a data integrity validation check on a document or other piece of input data, e.g., a digital certificate, such as an X.509-formatted certificate, or the like, without performing a full digital signature verification. Thus, according to the examples disclosed herein, techniques are presented for creating and utilizing so-called degenerate keys, e.g., degenerate RSA keys, to self-sign such documents or certificates.

More particularly, according to the RSA cryptosystem algorithm, two distinct prime numbers, which will be referred to herein as prime1 (also referred to as 'p' in the RSA cryptosystem) and prime2 (also referred to as 'q' in the RSA cryptosystem), are multiplied together to determine a modulus value, n, for both the public and private keys. Next, a public key exponent (also referred to as 'e' in the RSA cryptosystem) and a private key exponent (also referred to as 'd' in the RSA cryptosystem) are determined using, inter alia, Carmichael's totient function, as explained in further detail, e.g., in the RSA Cryptography Specification Version 2.1, RFC3447.

The value of the public key exponent, 'e,' along with the aforementioned modulus value, n, may be released as part of the public key. The value of the private key exponent, 'd,' will be maintained in secret as the private key exponent. The basic principle behind RSA encryption is that, while it is possible to find three very large positive integers, e, d, and n, such that, with modular exponentiation for all integers m (with 0≤m<n), the following equation holds true:

$$(m^e)^d \equiv m \pmod{n},\qquad\text{(Eqn. 1)}$$

(wherein the triple bar denotes modular congruence), even with knowing the value of 'e' and 'n,' it is extremely difficult for an unauthorized third party to determine the value of 'd,' i.e., the private key exponent.

In practice, the public key (including the values of 'n' and 'e', as discussed above) is used to encrypt a plaintext message, 'm,' into a cyphertext version of the message, 'c(m),' according to the following equation:

$$c(m) = m^e \bmod n,\qquad\text{(Eqn. 2)},$$

and the private key (including the value of 'd,' as discussed above) is used to decrypt the cyphertext, 'c,' back into the original plaintext message version of the cyphertext, 'm(c)', according to the following equation:

$$m(c) = c^d \bmod n,\qquad\text{(Eqn. 3)}.$$

According to some examples disclosed here, a degenerate RSA key is a key wherein both the private key exponent, 'e,' and the public key exponent, 'd,' of the RSA algorithm are intentionally set to be equal to 1. Because the decrypted version of the cyphertext generated using the RSA algorithm is determined according to Eqn. 3 above, then, by selecting the value of private key exponent ('d') to be equal to 1, Eqn. 3 above reduces to:

$$m(c) = c \bmod n,\qquad\text{(Eqn. 4)}.$$

By selecting the size of the modulus, n, such that c<mod n, Eqn. 4 further reduces to:

$$m(c) = c,\qquad\text{(Eqn. 5)}.$$

In other words, the plaintext of the message is the same as the cyphertext of the message. The same effect happens if the public key exponent, 'e,' in Eqn. 2 above is set to be equal to 1. That is, by intentionally setting the private key exponent and public key exponent values to be equal to 1, the original message value is equal to the encrypted value determined by the RSA algorithm, i.e., the true value of the content is simply passed through by the algorithm unchanged. In this manner, the typical security/encryption aspects of the RSA keys are thwarted via the use of the degenerate keys, whose creation and utilization (e.g., in the area of data integrity validation during a software testing or factory validation stage) will now be described in further detail below.

FIG. 1 is a flow chart illustrating a technique 100 for performing data integrity validation via the utilization of degenerate keys, in accordance with aspects of the present disclosure. At step 102, the method starts by creating a standard cryptographic key, e.g., using the OpenSSL software library. The generated key may, e.g., be an RSA key of a desired number of bits, e.g., 4,096 bits.

Next, at step 104, it may be desirable to optionally convert the standard key generated at step 102 into a modifiable, e.g., human readable, format, such as a formatted or plaintext file. As described above, the creation of the degenerate keys described herein may involve the targeted manipulation of one or more parameters of the generated cryptographic key, so as to remove the security functionality and render said keys degenerate. In some examples, e.g., when the created key is an RSA key, the relevant parameters of the generated RSA key may comprise: the modulus (also referred to as 'n' in the RSA cryptosystem), the public key exponent (also referred to as 'e' in the RSA cryptosystem), the private key exponent (also referred to as 'd' in the RSA cryptosystem), prime1 (also referred to as 'p' in the RSA cryptosystem), prime2 (also referred to as 'q' in the RSA cryptosystem), exponent1 (or, e1, determined by d mod (p−1)), exponent2 (or, e2, determined by d mod (q−1)), and coefficient (determined by (q$^{-1}$ mod p). By converting the standard RSA key into a modifiable format, these individual parameters may more readily be manipulated and modified, e.g., by a developer looking to create a degenerate RSA key for use in integrity validation checking during testing and/or factory validation.

Next, at step 106, the method may create a template for the degenerate key. In some examples, a simple Abstract Syntax Notation One (ASN.1) template may be created to hold the degenerate key information. According to some examples, at step 108, the process of filling in the template for the degenerate key may comprise copying the values for: modulus, prime1, prime2, and coefficient into the degenerate key template, e.g., according to a specified format. In some cases, it may be beneficial to, e.g., remove any colons, catenate the lines, and/or add a preceding 0x in certain fields to further simplify the processing and manipulation of the degenerate key template.

According to examples of degenerate RSA keys disclosed herein, at step 110, the private and public key exponents, as well as the values of e1 and e2, may each be set to a value of 1 and then also be copied into the degenerate key template. For reference, e1, e2, and the modulus are used for the Chinese Remainder Theorem (CRT) algorithm for efficient exponent and modulus operations. For example, these values may be defined as follows:

$$e1 = d \bmod (p-1) \quad \text{(Eqn. 6)},$$

$$e2 = d \bmod (q-1) \quad \text{(Eqn. 7), and}$$

$$\text{coefficient} = q^{-1} \bmod p \quad \text{(Eqn. 8)}.$$

Thus, by setting the private key exponent value, 'd,' to 1, the values of e1 and e2 also both become 1, and the value of coefficient is unchanged.

Next, at step 112, a degenerate key may be created based on the degenerate key template in a first format, wherein, as described above, the degenerate key is configured to be applied to a first input data and return an unchanged version of the first input data. In some examples, at step 113, the degenerate key template may optionally be converted into a first binary format, e.g., a .DER format or other binary format. According to some preferred examples, a check may be performed as part of step 113 to confirm that there were no typos or errors introduced in the process of creating the degenerate key in the first binary format from the degenerate key template.

Next, at step 114 (assuming any typos or errors have been corrected at step 113), the degenerate key may also optionally be created in a second format, e.g., a .PEM format or other ASCII-based format, wherein the creation of the key in the second format is based on the representation of the degenerate key in the first binary format. For example, .PEM files are essentially Base64-encoded versions of the corresponding .DER encoded file.

Next, at step 116, a data integrity validation test may be performed utilizing the degenerate key. In some examples, instead of signing a complete binary file (which may be very large), a secure hash function (e.g., SHA-1, SHA-256, SHA-512, etc.) may be used to take the very large binary file and create a smaller, fixed-size value called the hash. This hash is then what is actually signed, in order to determine whether or not the degenerate key worked properly. This hashed value may be referred to as a secure hash because, while it is easy to compute the hash for any electronic input data, it is very hard to find a second electronic input data that will result in the same hash value (i.e., the hash function is a many-to-one function, in mathematical terms). In other examples, the hash may be inserted at a particular portion of a digital certificate or signature file, e.g., at a known, tagged, or otherwise pre-specified location, so that it may be checked for during a data integrity validation process.

Thus, according to some examples, at step 116, the method may confirm that a hash of a given piece of input data is seen in an unchanged form in the secure hash representation of the given piece of input data, i.e., the hash that has been signed by the degenerate key. For example, if the originally-computed hash for the given piece of input data is the same as the value of the secure hash, then it may be concluded that data integrity has been maintained. If, instead, the two hash values are not the same, then it may be determined that data integrity has not been maintained. As mentioned above, by the use of degenerate keys, this data integrity validation check at step 116 may be performed without also performing a full digital signature verification of the sender's identity.

In some examples, a system or process utilizing the degenerate keys described herein may examine the public key field in the resulting degenerate key certificate (or signature file, or other data format that the degenerate key may be stored or transmitted in). If the type of the key is set to RSA, the public key exponent value is 1, and the device being signed is designated as general purpose (GP) or securable, it may serve as a trigger for the device to locate the hash of the to be signed (TBS) certificate, e.g., at a specified portion of the certificate, and then use it to validate the TBS field of the certificate. According to some examples, if desired, the code could also be configured to validate other fields in the certificate as well (e.g., the expmod field and/or the object identifier (OID) of the algorithm) to see if any of those values were corrupted or otherwise modified.

Figure 2:
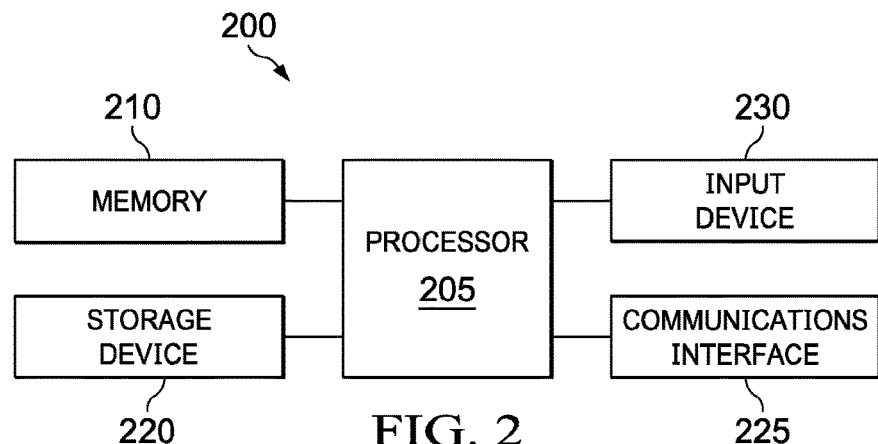
FIG. 2 is a block diagram of an example of a computing device, in accordance with aspects of the present disclosure.

As illustrated in FIG. 2, device 200 includes a processing element, such as processor 205, that contains one or more hardware processors, where each hardware processor may have a single or multiple processor cores. Examples of processors include, but are not limited to, a central processing unit (CPU) or a microprocessor. Although not illustrated in FIG. 2, the processing elements that make up processor 205 may also include one or more other types of hardware processing components, such as graphics processing units (GPUs), application specific integrated circuits (ASICs), field-programmable gate arrays (FPGAs), and/or digital signal processors (DSPs). In certain cases, processor 205 may be configured to execute programmed instructions to perform the tasks described in conjunction with the steps of FIG. 1.

FIG. 2 illustrates that memory 210 may be operatively and communicatively coupled to processor 205. Memory 210 may be a non-transitory computer readable storage medium or program storage device that is configured to store various types of data, including program instructions to cause a processor to perform one or more programmed actions. For example, memory 210 may include one or more volatile devices, such as Random Access Memory (RAM). In certain cases, the various degenerate key templates, certificates, and/or keys mentioned in FIG. 1 may be stored, at least temporarily, in the memory 210. Non-volatile storage devices 220 can include one or more disk drives, optical drives, solid-state drives (SSDs), tap drives, flash memory, electrically programmable read only memory (EEPROM), and/or any other type memory designed to maintain data for a duration time after a power loss or shut down operation. The non-volatile storage devices 220 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 205. In one example, the compiling process of the software program may transform program code written in a programming language to another computer language such that the processor 205 is able to execute the programming code. For example, the compiling process of the software program may generate an executable program that provides encoded instructions (e.g., machine code instructions) for processor 205 to accomplish specific, non-generic, particular computing functions.

After the compiling process, the encoded instructions may then be loaded as computer executable instructions or process steps to processor 205 from storage 220, from memory 210, and/or embedded within processor 205 (e.g., via a cache or on-board ROM). Processor 205 may be configured to execute the stored instructions or process steps, i.e., in order to perform instructions or process steps to transform the computing device into a non-generic, particular, and specially-programmed machine or apparatus. Stored data, e.g., data stored by a storage device 220, may be accessed by processor 205 during the execution of computer executable instructions or process steps to instruct one or more components within the computing device 200. Storage 220 may be partitioned or split into multiple sections that may be accessed by different software programs. For example, storage 220 may include a section designated for specific purposes, such as storing program instructions or data for updating software of the computing device 200. In one example, the software to be updated includes the ROM, or firmware, of the computing device. In certain cases, the computing device 200 may include multiple operating systems. For example, the computing device 200 may include a general-purpose operating system that is utilized for normal operations. The computing device 200 may also include another operating system, such as a bootloader, for performing specific tasks, such as upgrading and recovering the general-purpose operating system, and allowing access to the computing device 200 at a level generally not available through the general-purpose operating system. Both the general-purpose operating system and another operating system may have access to the section of storage 220 designated for specific purposes.

The one or more communications interfaces may include a radio communications interface for interfacing with one or more radio communications devices. In certain cases, elements coupled to the processor may be included on hardware shared with the processor. For example, the communications interfaces 225, storage, 220, and memory 210 may be included, along with other elements such as the digital radio, in a single chip or package, such as in a system on a chip (SOC). Computing device may also include input devices 230 and/or output devices, not shown, examples of which include sensors, cameras, human input devices, such as mouse, keyboard, touchscreen, monitors, display screen, tactile or motion generators, speakers, lights, etc. Processed input, for example from the input device 230, may be output from the computing device 200 via the communications interfaces 225 to one or more other devices.

The above discussion is meant to be illustrative of the principles and various implementations of the present disclosure. Numerous variations and modifications will become apparent to those skilled in the art, once the above disclosure is fully appreciated. It is intended that the following claims be interpreted to embrace all such variations and modifications.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), a digital signal processor (DSP), etc. The software that executes the techniques may be initially stored in a computer-readable medium such as compact disc (CD), a diskette, a tape, a file, memory, or any other computer readable storage device and then loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described examples, and other implementations are possible, within the scope of the claims.

What is claimed is:

1. A method, comprising:
    creating a first key, wherein the first key includes a first plurality of values;
    creating a template for a second key based on the first key;
    copying the first plurality of values from the first key into the template for the second key;
    setting a second plurality of values to 1;
    copying the second plurality of values into the template of the second key;
    creating the second key based on the template of the second key in a key format, wherein the second key is configured to be applied to a first input data and return an unchanged version of the first input data; and
    utilizing the second key to perform a data integrity validation test on the first input data.

2. The method of claim 1, wherein the first key is further created using an OpenSSL software library.

3. The method of claim 1, wherein the first key is further created using a Rivest-Shamir-Adleman (RSA) algorithm.

4. The method of claim 3, wherein a first value of the first plurality of values refers to a 'p' value in the RSA algorithm, wherein a second value of the first plurality of values refers to a 'q' value in the RSA algorithm, wherein a first value of the second plurality of values refers to a 'd' value in the RSA algorithm, wherein a second value of the second plurality of values refers to an 'e' value in the RSA algorithm, and wherein a third value of the first plurality of values refers to an 'n' value in the RSA algorithm.

5. The method of claim 1, further comprising using the second key to self-sign a first digital certificate.

6. The method of claim 1, wherein the first input data comprises a hashed value.

7. The method of claim 1, wherein the data integrity validation test is performed on the first input data during a software testing or factory validation stage.

8. A non-transitory program storage device comprising instructions stored thereon to cause one or more processors to:
    create a first key, wherein the first key includes a first plurality of values;
    create a template for a second key based on the first key;
    copy the first plurality of values from the first key into the template for the second key;
    set a second plurality of values to 1;
    copy the second plurality of values into the template for the second key;
    create the second key based on the template for the second key in a key format, wherein the second key is configured to be applied to a first input data and return an unchanged version of the first input data; and
    utilize the second key to perform a data integrity validation test on the first input data.

9. The non-transitory program storage device of claim 8, wherein the first key is further created using an OpenSSL software library.

10. The non-transitory program storage device of claim 8, wherein the first key is further created using an RSA algorithm.

11. The non-transitory program storage device of claim 10, wherein a first value of the first plurality of values refers to a 'p' value in the RSA algorithm, wherein a second value of the first plurality of values refers to a 'q' value in the RSA algorithm, a first value of the second plurality of values refers to a 'd' value in the RSA algorithm, wherein a second value of the second plurality of values refers to an 'e' value in the RSA algorithm, and wherein a third value of the first plurality of values refers to an 'n' value in the RSA algorithm.

12. The non-transitory program storage device of claim 8, wherein the stored instructions further cause the one or more processors to use the second key to self-sign a first digital certificate.

13. The non-transitory program storage device of claim 8, wherein the stored instructions further cause the one or more processors to:
perform the data integrity validation test on the first input data during a software testing or factory validation stage.

14. A system, the system comprising:
a memory; and
one or more processors operatively coupled to the memory, wherein the one or more processors are configured to execute non-transitory instructions causing the one or more processors to:
create a first key, wherein the first key includes a first plurality of values;
create a template for a second key based on the first key;
copy the first plurality of values from the first key into the template for the second key;
set a second plurality of values to 1;
copy the second plurality of values into the template for the second key;
create the second key based on the template for the second key in a key format, wherein the second key is configured to be applied to a first input data and return an unchanged version of the first input data; and
utilize the second key to perform a data integrity validation test on the first input data.

15. The system of claim 14, wherein the first key is further created using an OpenSSL software library.

16. The system of claim 14, wherein the first key is further created using an RSA algorithm.

17. The system of claim 16, wherein a first value of the first plurality of values refers to a 'p' value in the RSA algorithm, wherein a second value of the first plurality of values refers to a 'q' value in the RSA algorithm, wherein the a first value of the second plurality of values refers to a 'd' value in the RSA algorithm, wherein a second value of the second plurality of values refers to an 'e' value in the RSA algorithm, and wherein a third value of the first plurality of values refers to an 'n' value in the RSA algorithm.

18. The system of claim 14, wherein the one or more processors are further configured to execute the non-transitory instructions causing the one or more processors to use the second key to self-sign a first digital certificate.

19. The system of claim 14, wherein the first input data comprises a hashed value.

20. The system of claim 14, wherein the instructions further cause the one or more processors to:
perform the data integrity validation test on the first input data during a software testing or factory validation stage.

21. The method of claim 1, further comprising using the second key to self-sign a first digital certificate, wherein the first digital certificate comprises a hashed value;
wherein performing the data integrity validation test includes: triggering a device to locate a hash of a to be signed (TBS) certificate at a specified portion of the first digital certificate, and then using the hash of the TBS certificate to validate a TBS field of the first digital certificate.

* * * * *